Figures 1, 2:
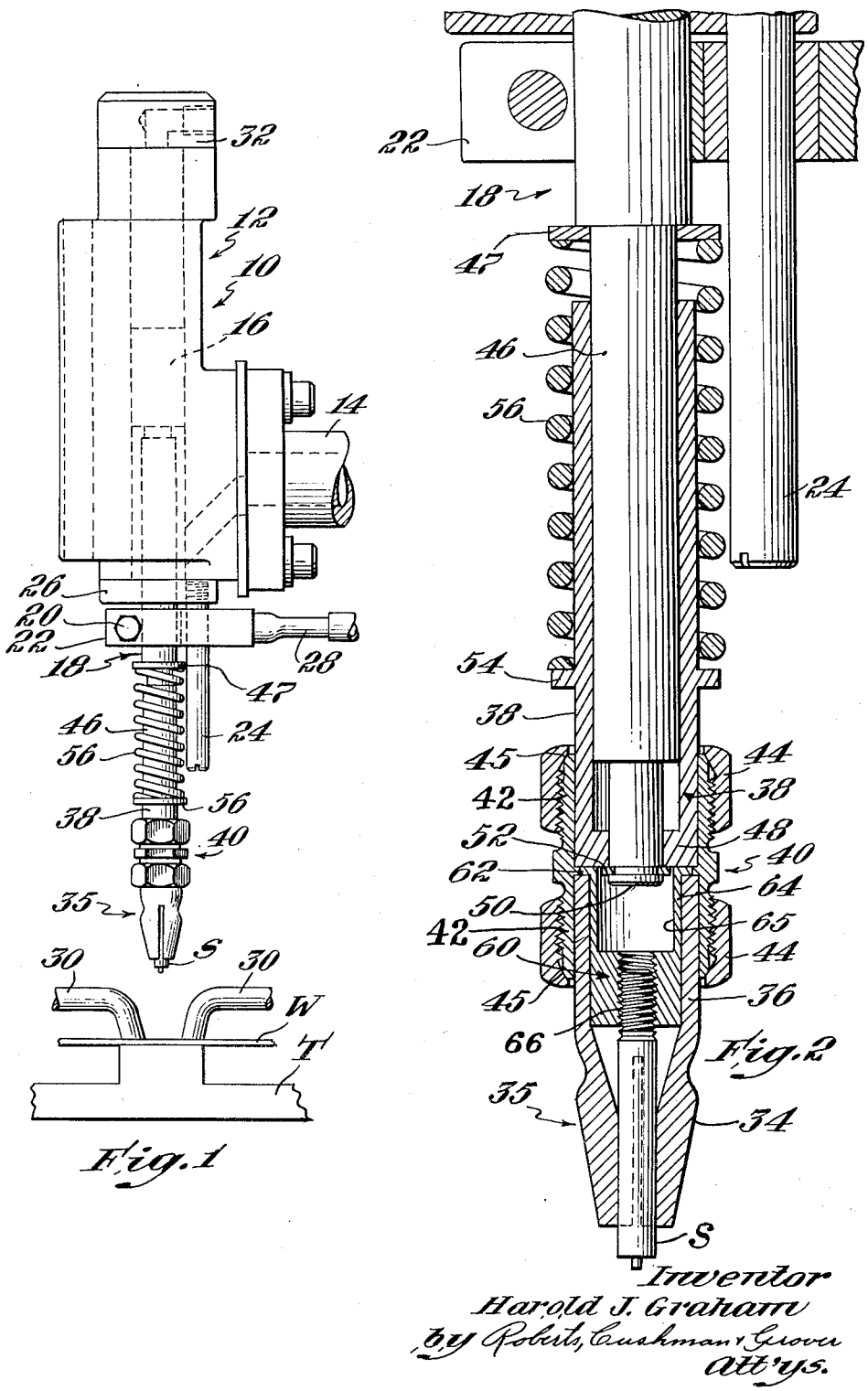

June 30, 1953  H. J. GRAHAM  2,644,068
WELDING DEVICE
Filed Jan. 17, 1950

Inventor
Harold J. Graham
by Roberts, Cushman & Grover
Att'ys.

Patented June 30, 1953

2,644,068

UNITED STATES PATENT OFFICE 2,644,068

WELDING DEVICE

Harold J. Graham, Highland Park, Mich., assignor to Graham Manufacturing Corporation, Detroit, Mich., a corporation of Michigan Application January 17, 1950, Serial No. 139,078

4 Claims. (Cl. 219—4)

When welding a stud, pin, or other small piece to a comparatively large work piece by means of percussion or other type of welding by pressurable contact such as that disclosed in my copending application Serial No. 81,130, filed March 12, 1949, now U. S. Patent 2,610,278, granted September 9, 1952, wherein an actuator imparts a blow to the work piece such as a stud during the welding operation, undesirable tool rebound effects may result due to the inherent elasticity of the stud and work piece. Accordingly it is the principal object of this invention to provide a device which will substantially eliminate such rebound.

Further objects are to provide such a device which is positive and automatic in operation, which can be readily adapted to existing welding apparatus, which is adaptable to mass production techniques, which is simple in construction, which requires a minimum of maintenance and which advances the art of welding generally.

In a broad aspect the invention contemplates welding apparatus having a power operated actuator or hammer for imparting a blow to a stud as it is being welded to a work piece, such terminology to include all welding guns or devices whether manually, pneumatically, hydraulically or electrically operated, which have an element forceably contacting one of the pieces being joined with sufficient momentum as to cause rebound of the contacting element. The apparatus or gun is in combination with a chuck for securing the stud and is located in the path of travel of the actuator. Elastic means, for example a spring, is interposed between the chuck and the actuator so that the initial movement which brings the stud into contact with the workpiece takes place through the medium of the spring just prior to the forceful action or blow imparted against the stud or supporting means therefor by the actuator. Upon the rebound or return of the actuator as a result of its momentum, due to its comparatively great mass and acceleration, the force exerted by the elastic means maintains the chuck and stud, which have relatively low mass in the position wherein the stud is in contact with the work piece.

In a more specific aspect the chuck has, in addition to jaws for securing the stud, an anvil portion, one end of which is located in the path of travel of the actuator, the other end bearing against one end of the stud to act as a stop so that the force from the actuator is applied to the stud. The chuck is also provided with a sleeve portion which is disposed about the actuator and slidably arranged with respect thereto. Such sleeve may be either an integral part of the chuck or a separate piece connected with the chuck jaws and anvil portion by means of an adaptor or connector.

These and other objects and aspects will be apparent from the following description of an illustrated specific embodiment of the invention, referring to a drawing in which:

Fig. 1 is a side elevation view of a welding gun incorporating a preferred embodiment of the device; and Fig. 2 is an enlarged fragmentary sectional view showing the details of construction of the chuck and associated coupling means.

Referring particularly to Fig. 1, the numeral 10 designates welding apparatus incorporating a gun for welding a stud S to a work piece W similar to the gun shown and described in detail in my above-mentioned copending application. The welding gun 10 comprises a generally cylindrical body 12 supported by a flange at the end of a hollow cantilever arm 14. The body 12 is provided with an axially disposed cylindrical aperture or cavity which acts as the cylinder for a piston 16 having depending therefrom a piston rod 18. The rod 18 has secured thereto by means of a bolt 20 a split guide piece 22 with an aperture therein acting as a way for a guide rod 24, one end of which threadingly engages an aperture in a lower head 26 for the body 12. The guide piece 22 also acts as an electrical receptacle for a cable 28 leading to one terminal of a welding power source (not shown) whose other terminal is connected to a metal work table T, whereupon the work piece W is secured by means of finger clamps 30. Stud S is initially retained at a predetermined distance from work piece W by conventional means for mounting the gun 12 on arm 14 and the arm on table T, as for example described in the above mentioned copending application.

Under the force exerted upon the top of the piston 16 by compressed air introduced through a passageway in the top of an upper cylinder head 32, the piston 16 and the rod 18 act as an actuator moving the stud S into contact with the work piece W and subsequently imparting a blow thereto as welding takes place. Accordingly the stud S is held by the deformation of jaws 34 (Fig. 2) of a chuck designated generally as 35. The upper ends of the jaws 34 terminate in a hollow cylindrical portion 36 which is connected to a hollow sleeve 38 by means of an adaptor or coupling 40.

The coupling 40 has an externally threaded ferrule 42 at either end thereof, the internal diameters of the ferrules being sufficiently greater than the outer diameters of the sleeve 38 and the cylindrical chuck portion 36 respectively to provide a loose fit therebetween before clamp nuts 44 are tightened upon the external ferrule threads. The ends of the ferrules 42 are each provided with a respective tapered portion 45, each of which is adapted to engage a corresponding internal taper at one end of the associated nut 44 so that the tightening of the nut upon the ferrule threads securely clamps the ends of the ferrule against the outer surface of either the sleeve 38 or the cylindrical portion 36 as the case may be.

The depending end portion 46 of the piston rod 18 is of reduced diameter as compared with the remainder of the rod thereby to form a shoulder against which bears a washer 47 whose purpose will be described below. The external diameter of the rod end portion 46 is proportioned with respect to the internal diameter of the sleeve 38 so as to form a freely sliding fit therebetween. The lower end of the sleeve 38 is partially closed by means of integral end 48 having an axially disposed aperture through which projects a head 50 which is an extension of the lower end 46 of the piston rod 18. A circumferential groove is cut in the outer periphery of the head near the lower end thereof, in which groove is carried a split snap ring 52. The ring 52 has a greater diameter than that of the aperture in the sleeve end 48 so that as the rod 18 is lifted by means of restoring air under pressure introduced beneath the piston 16 (Fig. 1) through the hollow supporting arm 14 and associated passageways, the sleeve 18 and the chuck 35 are conjointly moved upwardly. The ring 52 also serves to prevent the separation of the sleeve 38 and the rod 18 by the force exerted by elastic means, such as the helical spring 56, which surrounds the sleeve and is compressed between an annular shoulder 54 extending from the outer surface of the sleeve and the washer 47.

The downward movement of the piston 16 by operating air introduced through the upper head 32, as described heretofore, causes the head 50 to come in contact with the top of an anvil 60 which is a portion of the chuck 35, fitting inside of the cylindrical portion 36 thereof. The anvil 60 is held in position by a flange 62 which is clamped between the chuck cylindrical portion 36 and the end portion 48 of the sleeve 38. Rather than having the bottom portion of the anvil 60 bear directly against the end of the stud S as a stop, to accommodate variations in the length of the studs, a threaded piece 66 is provided which threadingly engages an axial aperture in the anvil 60. By turning, the piece 66 can be adjusted so that the end thereof bears against the stud thereby acting as a stop.

From the above it will be apparent that as operating air causes the piston 16 to descend, the piston rod 18 descends also, carrying with it the chuck 35 in the extended position shown in Fig. 2. Upon the contact of the stud S with the work piece W the spring 54 is compressed so that the head 50 descends through the aperture 65 in the anvil 60 to strike the top portion thereof, which forceable contact or blow is transmitted through the anvil to the upper end of the stud S. Due to the elasticity of the stud S and the work piece W, the momentum of the rod 18 and the piston 16 causes these pieces to rebound; the chuck, however, is maintained in the position wherein the stud S contacts work piece for an additional period by the force of the spring which overcomes the momentum due to the small mass of the stud and chuck. Upon the application of restoring air to the piston 16, the rod 18 is lifted until the ring 52 comes in contact with the end portion 48 of the sleeve 38, whereupon the entire chuck assembly 35 is lifted leaving the stud welded to the work piece W.

It should be understood that the present disclosure is for the purpose of illustration only and that this invention includes all modifications and equivalents which fall within the scope of the appended claims.

I claim:

1. In combination with a welding gun having a power operated actuator for exerting forging pressure as a stud is being welded to a work piece, a sleeve slidably mounted on the actuator, a chuck fastened to the end of said sleeve for securing the stud and having within the sleeve an anvil portion coaxially juxtaposed to the actuator to receive a direct blow therefrom, means for mounting said actuator and said chuck at a distance from said work piece to determine a given initial separation between stud and work piece, and elastic means interposed between the sleeve and the actuator for initially moving the chuck conjointly with the actuator to bring the stud into contact with the work piece, said elastic means being deformed by the movement of the actuator subsequent to the contact of the work piece by the stud and prior to imparting of the blow to the anvil portion, the amount of deformation of the elastic means being sufficient to absorb the rebound of the actuator subsequent to the blow and to maintain the chuck relatively stationary so that the stud remains in contact with the work piece during welding.

2. In combination with a welding gun having a power operated actuator for exerting forging pressure as a stud is being welded to a work piece, a chuck having a plurality of jaws for gripping the stud and an anvil portion which provides a rigid backing for the end of the stud, a sleeve slidably mounted on the actuator and carrying the chuck at one end to position the anvil portion to receive a direct blow from the actuator, and elastic means interposed between the sleeve and the actuator for moving the chuck conjointly with the actuator to bring the stud into contact with the work piece, the elastic means being deformed by the movement of the actuator subsequent to the contact of the work piece by the stud and prior to imparting of the blow to the anvil portion, the amount of deformation of the elastic means being sufficient to absorb the rebound of the actuator subsequent to the blow and to maintain the chuck relatively stationary so that the stud remains in contact with the work piece during welding.

3. In combination with a welding gun having a power operating actuator for exerting forging pressure as a stud is being welded to a work piece, a chuck having a plurality of jaws for gripping the stud and an anvil portion which provides a rigid backing for the end of the stud, a sleeve slidably mounted on the actuator, coupling means connecting the chuck to the sleeve to position the anvil portion to receive a direct blow from the actuator, and a spring extending between the sleeve and the actuator for moving the chuck conjointly with the actuator to bring the stud into contact with the work piece the spring being compressed by the movement of the actuator subsequent to the contact of the work piece by the stud and prior to the imparting of the blow, the amount of compression of the spring being sufficient to absorb the rebound of the actuator subsequent to the blow and to maintain the chuck relatively stationary so that the stud remains in contact with the work piece during welding.

4. In combination with a welding gun having a power operated actuator with a head for exerting forging pressure as a stud in being welded to a work piece, a chuck for securing the stud and having an anvil portion; a sleeve slidably mounted on the actuator, having an apertured end through which the actuator head projects, and having a shoulder extending laterally from the outer surface thereof; a coupling connecting the chuck to the sleeve to position the anvil portion to receive a direct blow from the actuator head; and a spring surrounding the sleeve and extending between the shoulder and the actuator for moving the stud into contact with the work piece, the spring being compressed by the movement of the actuator subsequent to the contact of the work piece by the stud and prior to the imparting of the blow by the head, the amount of compression of the spring being sufficient to absorb the rebound of the actuator subsequent to the blow and to maintain the chuck relatively stationary so that the stud remains in contact with the work piece during welding; said actuator head being provided with an extension having a greater lateral dimension than that of the aperture in the sleeve end so that as the actuator returns to its retracted position, the sleeve and chuck are conjointly returned.

HAROLD J. GRAHAM.

References Cited in the file of this patent

UNITED STATES PATENTS

| Number | Name | Date |
|---|---|---|
| 1,174,446 | Rietzel | Mar. 7, 1916 |
| 1,273,203 | Thornson | July 23, 1918 |
| 1,861,005 | Gibb | May 31, 1932 |
| 2,110,832 | Hogg et al. | Mar. 8, 1938 |
| 2,272,968 | Dyer | Feb. 10, 1942 |
| 2,383,695 | Thacker | Aug. 28, 1945 |
| 2,402,275 | Estes | June 18, 1946 |
| 2,473,927 | White | June 21, 1949 |
| 2,510,101 | Graham | June 6, 1950 |